US012596666B2

(12) United States Patent
Agarwal et al.

(10) Patent No.: US 12,596,666 B2
(45) Date of Patent: Apr. 7, 2026

(54) FRAME PACKING USING STORED TEMPLATES

(71) Applicant: Micron Technology, Inc., Boise, ID (US)

(72) Inventors: Nikesh Agarwal, Boise, ID (US); Chandana Manjula Linganaa, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 88 days.

(21) Appl. No.: 18/444,545

(22) Filed: Feb. 16, 2024

(65) Prior Publication Data

US 2024/0281399 A1     Aug. 22, 2024

Related U.S. Application Data

(60) Provisional application No. 63/485,816, filed on Feb. 17, 2023.

(51) Int. Cl.
*G06F 13/42*        (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS

| | | | | | |
|---|---|---|---|---|---|
| 11,886,372 | B1 * | 1/2024 | Ying | ................... | G06F 13/4221 |
| 11,892,955 | B2 * | 2/2024 | Goyal | ................. | G06F 13/1668 |
| 12,210,466 | B2 * | 1/2025 | Thanos | .................. | G06F 13/28 |
| 12,307,106 | B2 * | 5/2025 | Kim | ....................... | G06F 3/0604 |
| 12,432,156 | B2 * | 9/2025 | Patel | ....................... | H04L 47/28 |
| 2021/0112132 | A1 * | 4/2021 | Paliwal | ................... | H04L 45/74 |
| 2022/0066636 | A1 * | 3/2022 | Taki | ...................... | G06F 3/0679 |
| 2022/0141322 | A1 * | 5/2022 | Jeon | ........................ | H04L 67/04 |
| | | | | | 709/224 |
| 2022/0309021 | A1 * | 9/2022 | Jeon | ........................ | G06F 9/466 |
| 2023/0195368 | A1 * | 6/2023 | Agarwal | .............. | G06F 3/0604 |
| | | | | | 711/154 |
| 2023/0409505 | A1 * | 12/2023 | Liu | ...................... | G06F 13/4282 |

* cited by examiner

*Primary Examiner* — Henry Tsai
*Assistant Examiner* — Christopher A Daley
(74) *Attorney, Agent, or Firm* — Wood IP, LLC; Theodore A. Wood

(57)        ABSTRACT

A method performed by a protocol controller for packing a frame includes selecting, based on current contents of at least one message buffer, a stored packing template, and packing the frame in accordance with the selected packing template. The packing comprises packing each slot of the frame with a respective request (e.g., read request, write request) from the message buffer in accordance with the selected packing template. The template is selected from a plurality of stored packing templates. Associated host devices on which the protocol controller is arranged are also described.

18 Claims, 7 Drawing Sheets

202

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Downstream (FLIT 1) | Req | Req | | | Req | Req | | | Req | RwD | Data | Data | Data | Data | | CRC |
| Downstream (FLIT 2) | RwD | Data | Data | Data | Data | Data | | | | | Data | Data | Data | Data | | CRC |

204

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Downstream | Req | Req | RwD | Data | Data | Data | Data | Req | Req | RwD | Data | Data | Data | Data | Req | CRC |
| | H4 | G4 | G14 | | | | | G4 | G4 | G14 | | | | | G4 | |

FIG. 2

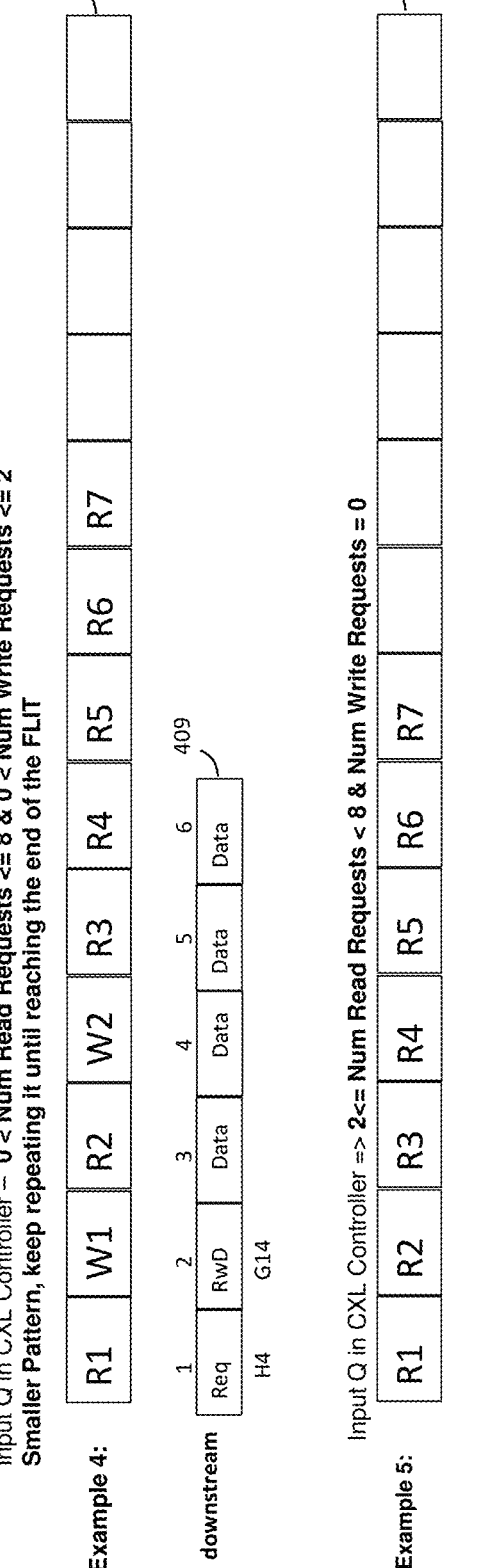

Example 4:

Input Q in CXL Controller – 0 < Num Read Requests <= 8 & 0 < Num Write Requests <= 2
Smaller Pattern, keep repeating it until reaching the end of the FLIT

| R1 | W1 | R2 | R3 | R4 | W2 | R5 | R6 | R7 | | | | |

408 downstream

| | 1 | 2 | 3 | 4 | 5 | 6 | |
| Req | RwD | Data | Data | Data | Data | |
| H4 | | G14 | | | | |

409

Example 5:

Input Q in CXL Controller => 2 <= Num Read Requests < 8 & Num Write Requests = 0

| R1 | R2 | R3 | R4 | R5 | R6 | R7 | | | | | |

410

Smaller Pattern, keep repeating it until reaching the end of the FLIT downstream

| | 1 | 2 | 3 | 4 |
| Req | Req | — | — |
| H4 | | G4 | |

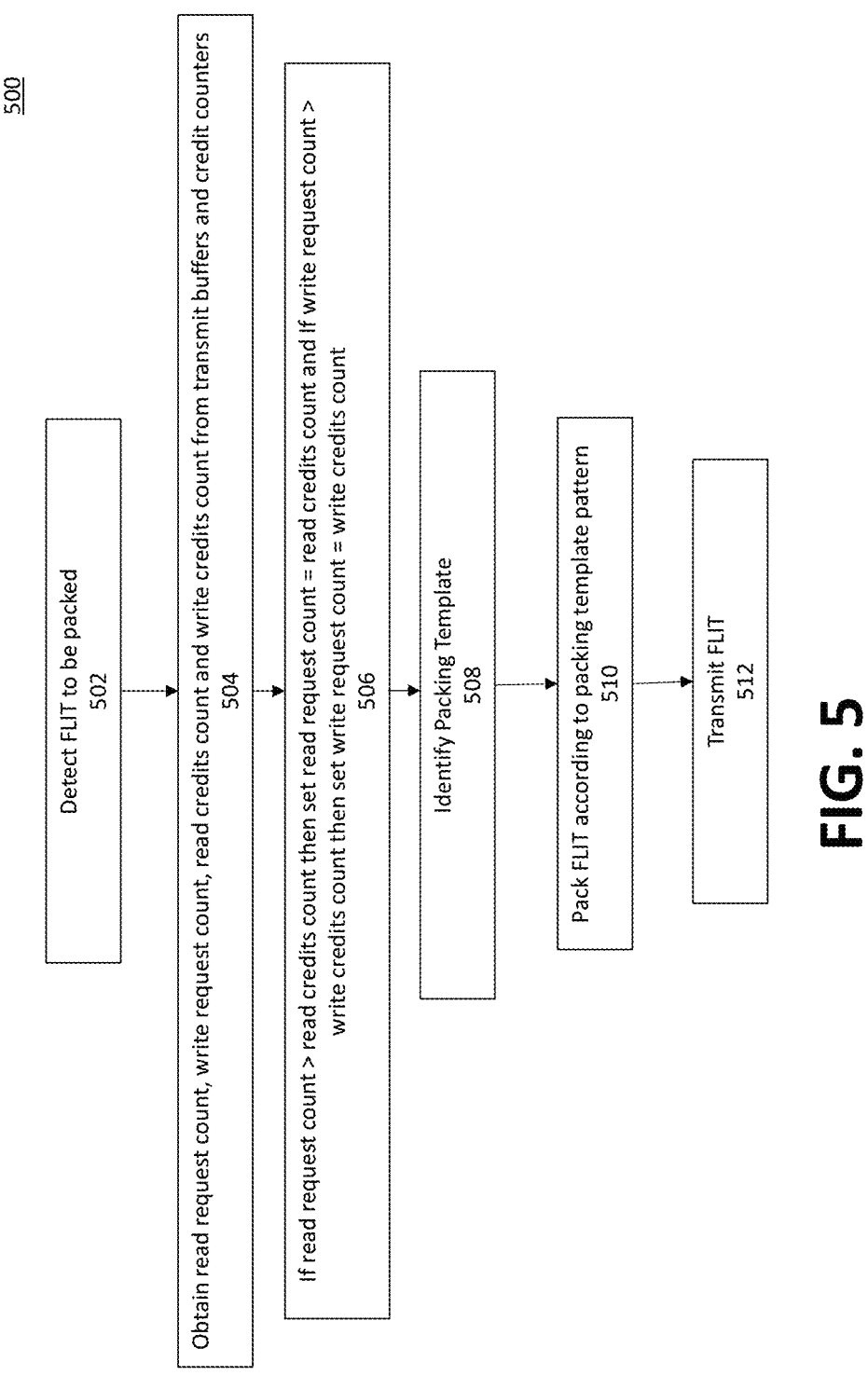

500

Detect FLIT to be packed
502

Obtain read request count, write request count, read credits count and write credits count from transmit buffers and credit counters
504

If read request count > read credits count then set read request count = read credits count and If write request count > write credits count then set write request count = write credits count
506

Identify Packing Template
508

Pack FLIT according to packing template pattern
510

Transmit FLIT
512

FIG. 5

FRAME PACKING USING STORED TEMPLATES

CROSS-REFERENCE TO RELATED APPLICATION

This application claims benefit to U.S. Provisional Patent Application No. 63/485,816, filed Feb. 17, 2023, the disclosure is incorporated herein by reference in its entirety.

FIELD OF TECHNOLOGY

The present disclosure relates to improving bandwidth utilization in communication links and in particular improving bandwidth utilization by reducing the number of unused slots in transmitted frames.

BACKGROUND

It is usually desired that interconnection networks and links have as low a latency as possible. That is, it is desired that the time taken to transfer a message from one node to another is kept minimal, while also enabling concurrent transactions. Multiple messages can flow through the interconnect network and/or links at any time instance. Each message to be transferred can be broken down into smaller chunks of data structures called packets. In the examples described in this disclosure, each packet may in turn be broken down into message flow control units or "flits." A flow control mechanism may decide which message gets to flow and which message is held back.

A flit (flow control unit) is a link-level data structure that forms a network packet or stream. For an example of how flits work in a network, an example of how packets are transmitted in terms of flits can be considered. A packet transmitting between A and B may happen in the following steps: The packet will be split into flits C, D and E; the transmit buffer in A will load the first flit C and send it to B; after B receives C, A moves the C out of the transmit buffer; the transmit buffer in A then loads the next flit D and sends it to B; and keep performing the above steps until all flits have been sent to B. B then combines all the flits to generate the packet.

The communication via flits between a host, such as a central processing unit (CPU) and another device (e.g., a memory device) may be carried out in accordance with a standard protocol. Compute Express Link (CXL) is a dynamic multi-protocol technology designed to support accelerators and memory devices. In the CXL protocol, CXL Link Layers (the link layer) is responsible for reliable transmission of transaction layer packets (TLP) across a Flex Bus link.

CXL provides a rich set of protocols that include I/O semantics similar to Peripheral Component Interconnect Express (PCIe) (I.E., CXL.io), caching protocol semantics (i.e., CXL.cache), and memory access semantics (i.e., CXL.mem) over a discrete or on-package link. CXL.io is required for discovery and enumeration, error report, and host physical address (HPA) lookup. CXL.mem and CXL-.cache protocols may be optionally implemented by the particular accelerator or memory device usage model.

As noted above, the flit is a unit amount of data when the message is transmitting at link-level. According to the CXL protocol, a flit can be accepted or rejected at the receiver side based on the flow control protocol and the size of the receive buffer. The mechanism of link-level flow control allows the receiver to send a continuous signals stream to the transmitter to control if it should keep sending flits or stop sending flits. When a packet is transmitted over a link, the packet will often need to be split into multiple flits before the transmitting begins.

For CXL.cache and CXL.mem, layouts, such as, for example, a 528-bit flit layout is specified. Flit packing rules for selecting transactions from internal queues to fill the available slots (e.g., 3 slots per flit in one example CXL implementation, 16 slots in another example CXL implementation) in the flit are also specified. Other features described for CXL.cache and CXL.mem include a retry mechanism, link layer control flits, cyclic redundancy check (CRC) calculation, and viral and poison. A key benefit of CXL is that it provides a low-latency, high-bandwidth path for an accelerator to access the system and for the system to access the memory attached to the CXL device.

Flex Bus provides a point-to-point interconnect that can transmit native PCIe protocol or dynamic multi-protocol CXL to provide I/O, caching, and memory protocols over PCIe electricals. The primary link attributes include support of the following features: native PCIe mode, full feature support as defined in the PCIe specification; CXL mode, as defined in this specification; Configuration of PCIe vs CXL protocol mode; Signaling rate of 32 GT/s, degraded rate of 16 GT/s or 8 GT/s in CXL mode; Link width support for x16, x8, x4, x2 (degraded mode), and x1 (degraded mode).

The CXL Specification defines some flit packing rules. It is assumed that a given queue has credits towards the receiver and any protocol dependencies (SNP-GO ordering, for example) have already been considered. Rollover is defined as any time a data transfer needs more than one flit. Example flit packing rules may include that a data chunk which contains 128 b (format G0), can only be scheduled in slots 1, 2, and 3 of a protocol flit since slot 0 has only 96 b available, as 32 b are taken up by the flit header.

The following rules apply to rollover data chunks: If there's a rollover of more than 3 16 B data chunks, the next flit must necessarily be an all data flit; If there's a rollover of 3 16 B data chunks, slots 1, slots 2 and slots 3 must necessarily contain the 3 rollover data chunks, and slot 0 will be packed independently (it is allowed for slot 0 to have the data header for the next data transfer); If there's a rollover of 2 16 B data chunks, slots 1 and slots 2 must necessarily contain the 2 rollover data chunks. slot 0 and slot 3 will be packed independently; If there's a rollover of 1 16 B data chunk, slot 1 must necessarily contain the rollover data chunk. Slot 0, slot 2 and slot 3 will be packed independently; If there's no rollover, each of the 4 slots will be packed independently.

Memory media (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0.

In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. DRAM is organized as an array of storage cells with each cell storing a programmed value. SRAM memory may maintain their programmed states for the duration of the system being powered on. Non-volatile memory cells (e.g., NOT-AND (NAND) memory cells) may maintain their programmed states for extended periods of time even in the absence of an external power source.

Memory media may be coupled to a host (e.g., a host computing device) to store data, commands, and/or instructions for use by the host while the computer or other electronic system is operating. For example, data, commands, and/or instructions can be transferred between the host and the memory device(s) during operation of a computing or other electronic system. A controller, referred to as a "memory controller", may be used to manage the transfer of data, commands, and/or instructions between the host and the memory devices.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 2 schematically illustrates examples of inefficiently packed flits, and an example of an efficiently packed flit according to some embodiments of the present disclosure.

FIGS. 4A, 4B and 4C (collectively FIG. 4) illustrate example input buffers and example flits that are each packed according to a packing template from a plurality of stored packing templates, according to some embodiments of the present disclosure.

FIG. 5 is a flowchart of a process for packing flits in accordance with stored packing templates, in accordance with some embodiments of the present disclosure.

DETAILED DESCRIPTION

In example embodiments, packing of a frame that is to be transmitted, or more specifically, packing respective slots of the frame with control information or data to be transmitted, is done in accordance with the pattern of slots in a packing template. The packing template is selected from a stored plurality of packing templates. It is intended that the selected packing template specifies an optimal packing of the frame for the particular traffic mix being transmitted.

In an embodiment, the frame is a flit that is being used for transmission of read requests and write requests from a host to a target device over a CXL interface. The target device may be a memory controller or the like. By providing for the packing of flits in accordance with slot patterns that are known to be optimal and/or desirable for certain traffic mixes, example embodiments improve the efficiency of flits that are transmitted by the protocol controller (e.g., CXL controller) on the transmitting device.

Figure 1:
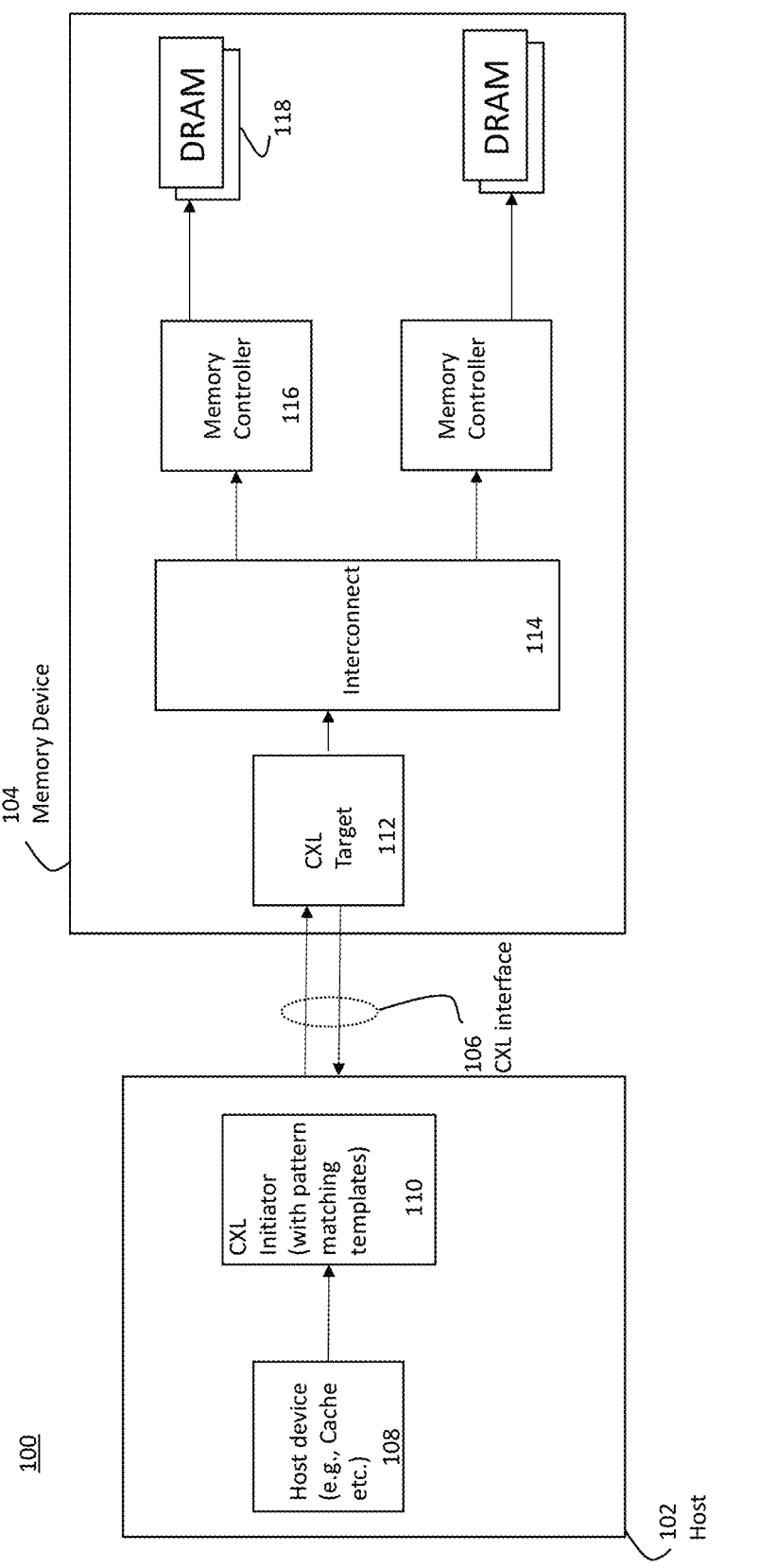
FIG. 1 illustrates an example functional block diagram of a computing system including an interface host device, an interface target device, and a communication interface (e.g., CXL interface) connecting the host and target devices that are configured to improve bandwidth utilization in accordance with some example embodiments of the present disclosure.

FIG. 1 illustrates an example functional block diagram of a computing system 100 including an interface host (CXL initiator) device 110, an interface target (controller) 112, and a communication interface 106. The interface 106 connects the host and target devices configured to improve bandwidth utilization in accordance with the embodiments. The communication interface 106 is a CXL interface configured to connect the CXL initiator 110 (also referred to as an initiator, CXL host, or CXL master) and CXL target 112 (also referred to as CXL slave). This connection may occur in accordance with, for example, CXL 2.0 and/or CXL 3.0 protocol specifications. Example embodiments, however, are not limited to the mentioned versions of CXL, or to the CXL protocol.

Host 102 may be a computer or the like with one or more processors 103, such as a central processing unit (CPU), a graphics processing unit (GPU), application specific integrated circuit system (ASIC), field programmable gate array (FPGA), or another type of processor). Host 102 may further include a host component device 108 such as, for example, a cache memory.

The host 102 may be configured to access a device, such as, for example, a memory device 104. Memory device 104 may include one or more memory media 118 such as DRAM modules. The memory device 104 may be configured as a main memory, or some other memory, of the host 102. Example embodiments are not limited to DRAM, and may, for example, include memory devices 104 that have one or more modules of one, or a combination, of memory types such as DRAM and SRAM.

The host 102 and the memory device 104 communicate via communication interface 106. Communication interface 106 comprises bidirectional (e.g., two unidirectional) links, one unidirectional link on which the host 102 transmits messages to the memory device 104 and another unidirectional link on which the memory device 104 transmits messages to the host 102.

According to some embodiments, the communication interface 106 is configured to operate in accordance with the CXL standard. When operating as a CXL interface based on PCIE 5.0/6.0, communication interface 106 comprises a pair of unidirectional links—each contributing to system bandwidth. CXL2.0 provides an interface which leverages PCIE 5.0 (32 GT/s), and CXL 3.0 leverages PCIE 6.0 (64 GT/s) in each direction.

According to some embodiments in which the communication interface 106 operates in accordance with CXL, the memory device 104 is a CXL Type 3 device, which means that the interface operates in a host-target (also referred to as master-slave) mode in which the CXL initiator 110 in host 102 operates as host and the CXL target 112 in the memory device 104 operates as target. In other words, in these particular embodiments in which the memory device is a CXL Type 3 device, all requests (e.g., read requests and write requests) are initiated by the host 102 and the memory device 104 responds to such requests. Example embodiments, however, are not limited to host-target configurations.

Multiple requests and data are transported over the communication interface 106 flits, which, in some embodiments, are fixed width flits. The host device (e.g., CXL Initiator) is responsible for generating requests to the memory device (e.g., CXL target). The memory device has a CXL controller to unpackage the flit requests incoming from the host and forwards the requests to the backend memory media (e.g., DRAM). Each flit in CXL 2.0 is of 528 bits (4 slots each of 16 B+2 bytes for CRC=66 B or 528 bits). Each flit in CXL 3.0 is of 256 B (16 slots each of 16 B where 238 B in each flit is for TLP Payload and 18 B is for CRC and FEC). In some embodiments, in CXL 3.0, 15 out of the 16 slots can be used for multiple requests and data.

In example embodiments, the controllers (CXL initiator) 110 and (CXL target) 112 are configured to implement the functionality required by CXL. For example, CXL initiator 110 and CXL target 112 operate to package messages or TLP into flits for transmission over communication interface 106, and to unpack flits received over the communication interface 106 to obtain the transmitted messages.

As noted above, in some embodiments, memory device 104 is a CXL compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When memory device 104 is CXL compliant, the interface management circuitry in the CXL target 112 (including data link and transaction control) may use CXL protocols to manage the communication interface 106 which may comprise PCIe PHY interfaces.

According to some embodiments, the memory media 118 includes one or more DRAM devices. In some embodiments, the main memory for computer system 100 is stored in DRAM cells that have high storage density. DRAM cells lose their state over time. That is, the DRAM cells must be refreshed periodically, hence the name Dynamic. DRAM may be organized according to a hierarchy of storage organization comprising a dual in-line memory module (DIMM), rank, bank, and array.

A DIMM comprises a plurality of DRAM chips, and the plurality of chips in a DIMM are organized into one or more ranks. Each chip is formed of a plurality of banks. A bank is formed of one or more rows of the array of memory cells. All banks within the rank share all address and control pins. All banks are independent, but in some embodiments, only one bank in a rank can be accessed at a time. Because of electrical constraints, only a few DIMMs can be attached to a bus. Ranks help increase the capacity on a DIMM.

Multiple DRAM chips are used for each access to improve data transfer bandwidth. Multiple banks are provided so that the computing system can simultaneously process different requests. To maximize density, arrays within a bank are made large, rows are wide, and row buffers are wide (8 KB read for a 64 B request). Each array provides a single bit to the output pin in a cycle (for high density and because there are few pins). DRAM chips are often described as xN, where N refers to the number of output pins. One rank may be composed of eight x8 DRAM chips (e.g., the data bus is 64 bits). Banks and ranks offer memory parallelism, and the memory device 104 may schedule memory accesses to maximize row buffer hit rates and bank/rank parallelism.

In some embodiments, the memory media 118 is low power double data rate (LPDDR) LP5 or other similar memory interfaces. However, embodiments are not limited thereto, and memory media 118 may comprise one or more memory media of any memory media types, such as, but not limited to, types of DRAM.

Each of the plurality of media controllers 116 can receive the same command (e.g., command to read or write memory media 118) and address and drive the plurality of channels connecting to the memory media substantially simultaneously. By using the same command and address for the plurality of media controllers, each of the plurality of media controllers 116 can utilize the plurality of channels to perform the same memory operation on the same plurality memory cells. Each media controller 118 can correspond to a redundant arrays of inexpensive disks (RAID) component. As used herein, the term substantially intends that the characteristic need not be absolute but is close enough so as to achieve the advantages of the characteristic.

For example, substantially simultaneously is not limited to operations that are performed simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized substantially simultaneously may not start or finish at the same time. For example, multiple memory controllers can be utilized such that they are writing data to the memory devices at the same time, regardless of whether one of the media controllers commences or terminates prior to the other.

A front-end portion of memory device 104 includes the CXL target 112 and an interconnect 114 (e.g., CXL interconnect) to couple the one or more media controllers 116 to the host device 102 through one or more input/output (I/O) lanes of the communication interface 106. The communications over I/O lanes may be according to a protocol such as, for example, PCIE. In some embodiments, the plurality of I/O lanes can be configured as a single port. Example embodiments may not be limited by the number of I/O lanes, whether the I/O lanes belong to a single port, or the communication protocol for communicating with the host.

Communication interface 106 receives data and/or commands from the CXL initiator 110 through one or more I/O lanes. In an embodiment, the communication interface 106 is a physical (PHY) interface configured for PCIe communications. The CXL initiator 110 and the CXL target 112 include interface management circuitry (including data link and transaction control) which provides higher layer protocol support for communications with each other through the type of PHY interface in the communication interface 106.

The memory device 104 includes the memory media controllers 116 and other circuitry to control, in response to receiving a request or command from host 102, performance of a memory operation. The memory operation can be a memory operation to read data from, or write data to, the memory media 118.

The memory device 104 may also comprise a security component configured to encrypt the data before storing, and to decrypt data after reading, the data in memory media 118. In some embodiments, memory device 104 may also include a cache memory to store data associated with the performance of the memory operations.

In some embodiments, in response to receiving a request from host 102, data read from or written to the memory media 118 can be stored in cache lines of a cache memory on the memory device 102. The data in the cache memory can be written to the memory media 118. In some embodiments, an error correction component on the memory device is configured to provide error correction to data read from and/or written to the memory media 118. In some embodiments, the data can be encrypted using an encryption protocol such as, for example, Advanced Encryption Standard (AES) encryption, before the data is stored in the cache memory.

A management unit located in the memory device 104 may be configured to control operations of the memory device 104. The management unit may recognize commands from the host 102 and accordingly manage the one or more memory media 118. In some embodiments, the management unit includes an I/O bus to manage out-of-band data, a management unit controller to execute a firmware. The firmware functionality includes, but not limited to, monitoring and configuring the characteristics of the memory device 104. The management unit also includes a management unit memory to store data associated with the memory device 104 functionalities. The management unit controller may also execute instructions associated with initializing and configuring the characteristics of the memory device 104.

A backend portion of the memory device 104 is configured to couple to one or more types of memory media (e.g., DRAM media 118) via (e.g., through) a plurality of channels, which can be used to read/write data to/from the memory media 118, to transmit commands to the memory media 118, to receive status and statistics from memory media 118, etc. The management unit can couple, by initializing and/or configuring the memory device 104 and/or the memory media 118 accordingly, the memory device 104 to an external device.

Such an external device may include the host 102 that can generate requests to read or write data to and/or from the memory media. The management unit is configured to recognize received commands from the host 102 and to execute instructions to apply a particular operation code associated with received host commands for each of a plurality of channels coupled to the memory media 118.

The backend portion includes a media controller portion comprising one or more media controllers 116 and a PHY layer portion comprising a plurality of PHY interfaces connecting the media controllers to the memory media. In some embodiments, the backend portion is configured to couple the PHY interfaces to a plurality of memory ranks of the memory media 118. Memory ranks can be connected to the memory controller(s) 116 via a plurality of channels.

A respective one of the media controllers 116 and a corresponding PHY interface may drive a channel to a memory rank. In some embodiments, each of the media controllers 116 can execute commands independent of the other media controllers 116. Therefore, data can be transferred from one PHY interface through a channel to the memory media 118 independent of other PHY interfaces and channels.

Each PHY interface may operate in accordance with the PHY layer that couples the memory device 104 to one or more memory ranks in the memory media 118. As used herein, the term PHY layer generally refers to the physical layer in the Open Systems Interconnection (OSI) model of a computing system. The PHY layer may be the first (e.g., lowest) layer of the OSI model and can be used to transfer data over a physical data transmission medium. In some embodiments, the physical data transmission medium can be a plurality of channels.

As used herein, the term memory ranks generally refer to a plurality of memory chips (e.g., DRAM memory chips) that can be accessed simultaneously. In some embodiments, a memory rank can be sixty-four (64) bits wide and each memory rank can have eight (8) pages. In some embodiments, a page size of a first type of memory media device can be larger than a page size of the second type of memory media device. Example embodiments, however, are not limited to particular widths of memory ranks or page sizes.

Each media controller may include a channel control circuitry and a plurality of bank control circuitry where a respective one of the plurality of bank control circuitry is configured to access a respective bank of the plurality of banks on the media device 118 accessed by the respective media controller 116.

Rank, channel, and bank can be considered hardware-dependent logical groupings of storage locations in the media device. The mapping of rank, channel and bank logical groupings to physical storage locations or rows in the memory media device may be preconfigured, or may be configurable, in some embodiments by the memory controller in communication with the memory media 118.

In streaming read request or write request traffic over a communications link such as, for example, a CXL link 106, conventional flit packing techniques typically extract requests from the input message buffer in first-in-first-out (FIFO) order to sequentially populate the slots in the current flit. Such conventional techniques may, due to the different number of slots occupied by different request types and CXL rules for flit packing etc., can result in some flits being transmitted with a substantial proportion of their slots being empty (i.e., without carrying any request). Such empty slots in flits transmitted over a link, such as CXL link 106, results in low bandwidth utilization of the link, and consequently the communication from host to target being inefficient.

FIG. 2 schematically illustrates an example packing of 5 read requests and 2 write requests in accordance with a conventional packing technique into two CXL flits 202. As can be seen, the CXL protocol packing rule of not permitting more than two read requests in consecutive slots, causes a substantial portion of the slots in the first flit (flit 1) to remain empty. Due to the many slots that remain empty in the first flit, the second write request cannot be accommodated in the first flit and is consequently accommodated in a second flit (flit 2).

More particularly, in this instance, although 5 slots of the 15 available slots remain empty in the first flit, due to the manner in which the empty slots are distributed in the flit, the second write request which requires exactly 5 slots cannot be accommodated in the first flit. This packing may occur, for example, when requests are assigned to sequential slots of the flit in FIFO ordering of the requests as in some conventional packing techniques.

In contrast, embodiments of the present disclosure may pack all the 5 read requests and the 2 write requests into a single more efficiently packed flit 204. As illustrated, after the first and second read requests are assigned consecutive slots 1 and 2, the first write request is assigned. This avoids wasting the slots immediately following the first two read requests as in slot assignment pattern 202. In a similar manner, read requests 3 and 4 are followed by the second write request. In that manner, the remaining read request can be assigned to the only remaining slot (slot 15). In this way, all 5 read requests and the 2 write requests are accommodated in a single flit 204.

Persons of skill in the art will appreciate that transmitting read requests and write requests in more tightly packed flits such as, for example, flit 204, would result in substantially improved utilization of available bandwidth on a communication link, such as link 106, as compared to inefficiently packed flits such as flits 202. The capability to efficiently pack slots of a flit, often in the most optimal manner for a particular traffic mix, additionally leads to faster response times. This capability may also provide for more efficient power utilization because it can reduce the number of flits transmitted for a particular traffic mix.

In protocols, such as CXL, flit packing constraints can make the packing structure very complicated to implement in real hardware. In mixed traffic conditions, based on the order of incoming requests, the problem can be even worse. Rules of flit packaging can vary as message headers change and as the protocol evolves. For example—from CXL 2.0 (64 B Flit) and CXL 3.0 (256 B Flit) message headers and packaging rules within a flit have changed significantly.

In the face of such changes to the protocol, new hardware blocks with newer algorithms must be designed for efficient packing of flit and performance optimizations. It may require designing of complex algorithms to ensure empty slots within the flit are optimally utilized while being consistent with all flit packing constraints/rules. This increases the cost of hardware testing, verification and validating any impact on performance. Such changes also increase the time to production of protocol-enables products.

Figure 3:
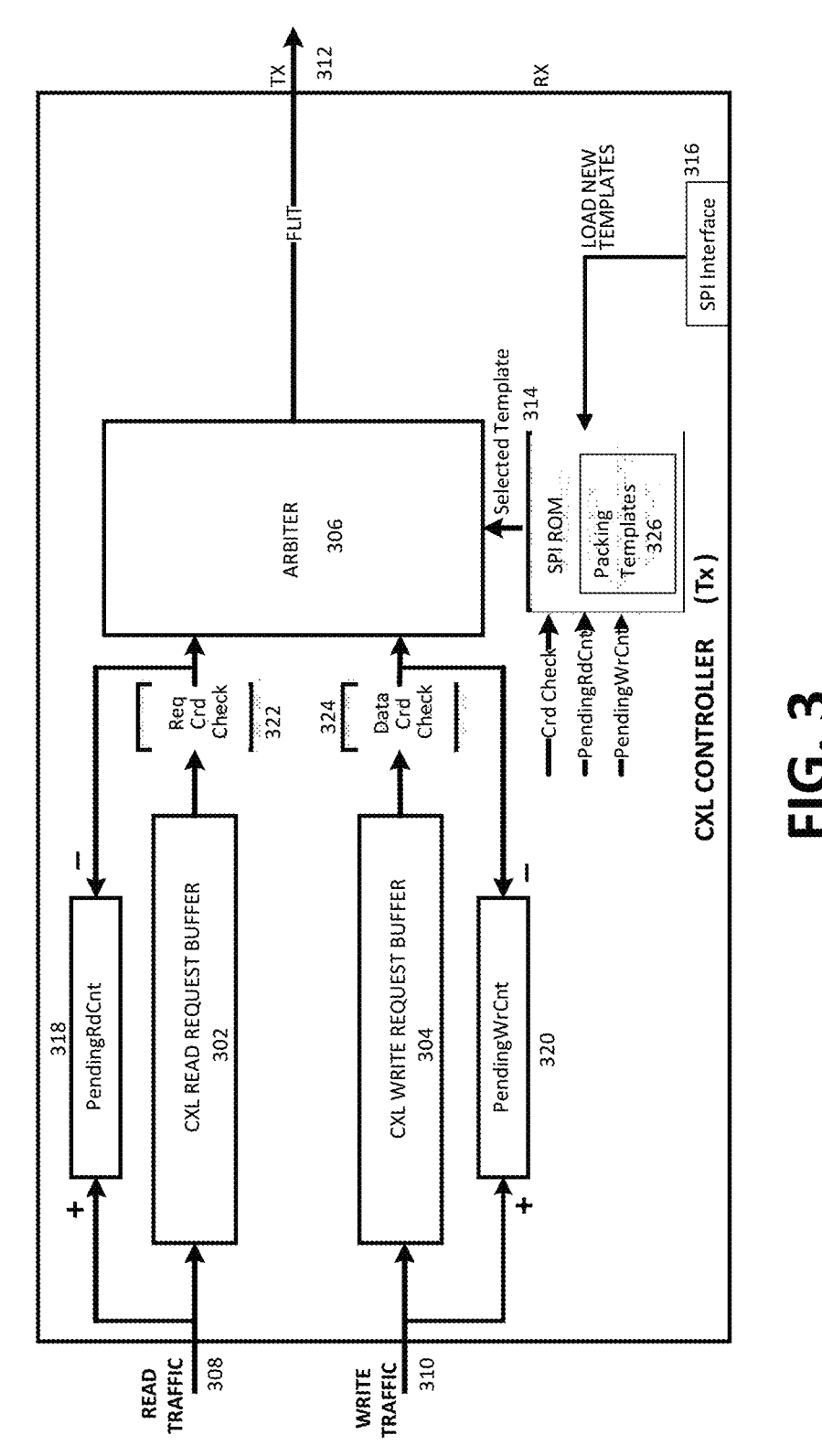
FIG. 3 schematically illustrates a portion of a protocol controller that is configured for packing flits based on pattern matching packing templates, according to some embodiments of the present disclosure.

FIG. 3 schematically illustrates a portion of a protocol controller 300 configured for packing flits based on pattern matching packing templates, according to the embodiments.

Protocol controller 300 may be a CXL protocol controller, and, more particularly a transmit portion of a CXL controller. In some embodiments, the CXL initiator 110 of the host 102 may use an implementation of protocol controller 300 as the transmit portion of the protocol controller.

The protocol controller 300 receives (e.g., from other components of host 102) read requests 308 and write requests 310 as input, and outputs (e.g., to be transmitted to a target device 104 over the communication interface 106) flits that are packed with read requests and write requests. The input read requests 308 are temporarily stored in an input read request buffer 302 and the input write requests 310 are temporarily stored in an input write request buffer 304. The term input buffer is used herein to refer to either one or both of read request buffer 302 and write request buffer 304.

A pending read request counter 318 and a pending write request counter 320 are configured to maintain a count of the number of read requests in the read request buffer 302 and the number of write requests in the write request buffer 304, respectively. Each addition of the read request to the read request buffer 302 increments the pending read request counter 318 and each removal of a read request from the read request buffer 302 decrements the pending read request counter 318. Each addition of the write request to the write request buffer 304 increments the pending write request counter 320 and each removal of a write request from the write request buffer 304 decrements the pending write request counter 320.

In some embodiments, a read request transmits credit counter 322 maintains a count of credits available for transmitting read requests, and a write request transmit credit counter 324 maintains a count of credits available for transmitting write requests. The controller 300 internally implements a credit mechanism that increments and decrements the credit counters 322 and 324 in accordance with the bandwidth availability for transmission of the respective types of requests. Credits are used in some embodiments for purposes of PCIE flow control.

A memory 314, which may be, for example, a ROM, stores a plurality of flit packing templates 326. Each of the stored flit packing templates 326 stores a unique pattern of slots, each of which may be assigned to a read request, a write request, or empty. According to an embodiment, for each combination of the number of read requests and the number of write requests that can be accommodated in a single flit, a packing template that defines a preferred slot pattern is present in the stored plurality of packing templates. It is intended in example embodiments that each stored packing template specified a slot pattern that is optimal, or at least preferred, for a particular mix of read requests and write requests that is being transmitted in a flit.

The ROM 314 may be a Serial Peripheral Interface (SPI) ROM that can be modified via an SPI interface 316. The SPI interface 316 may be used to modify and/or update one or more of the pluralities of packing templates 326 that are stored. In some embodiments, the plurality of templates is updated for respective protocol version updates etc., that may specify new frame formats. In an embodiment, the SPI ROM is flashed with flit templates matching different patterns of read and write requests pending for a particular protocol and packing rule constraints.

The controller 300 is configured to select a packing template from the plurality of packing templates 326 for each flit to be transmitted on interface 312. The selection may be made based on the count of pending read requests, count of pending write requests, read request transmit credit availability and write request transmit credit availability. The selection process may be configured to identify, from among the plurality of stored packing templates, the template that is the most optimal (e.g., most efficient) slot packing pattern for transmitting the specified mix of read requests and write request.

The arbiter 306 obtains the identified (selected) packing template from memory 314 and selects read requests and write requests to be assigned in accordance with the slot pattern of the identified packing template to respective slots of the flit to be transmitted. In some embodiments, the requests of each type are selected in a FIFO ordering.

The selection of requests may also include other considerations (e.g., dependencies etc.). The arbiter may, in some embodiments, control the credit counters 322 and 324. The packed flit, packed according to the slot pattern in the selected frame, is transmitted on interface 312. The interface 312 may, for example, be an interface such as interface 106 and may operate in accordance with the CXL protocol.

Figure 4A:
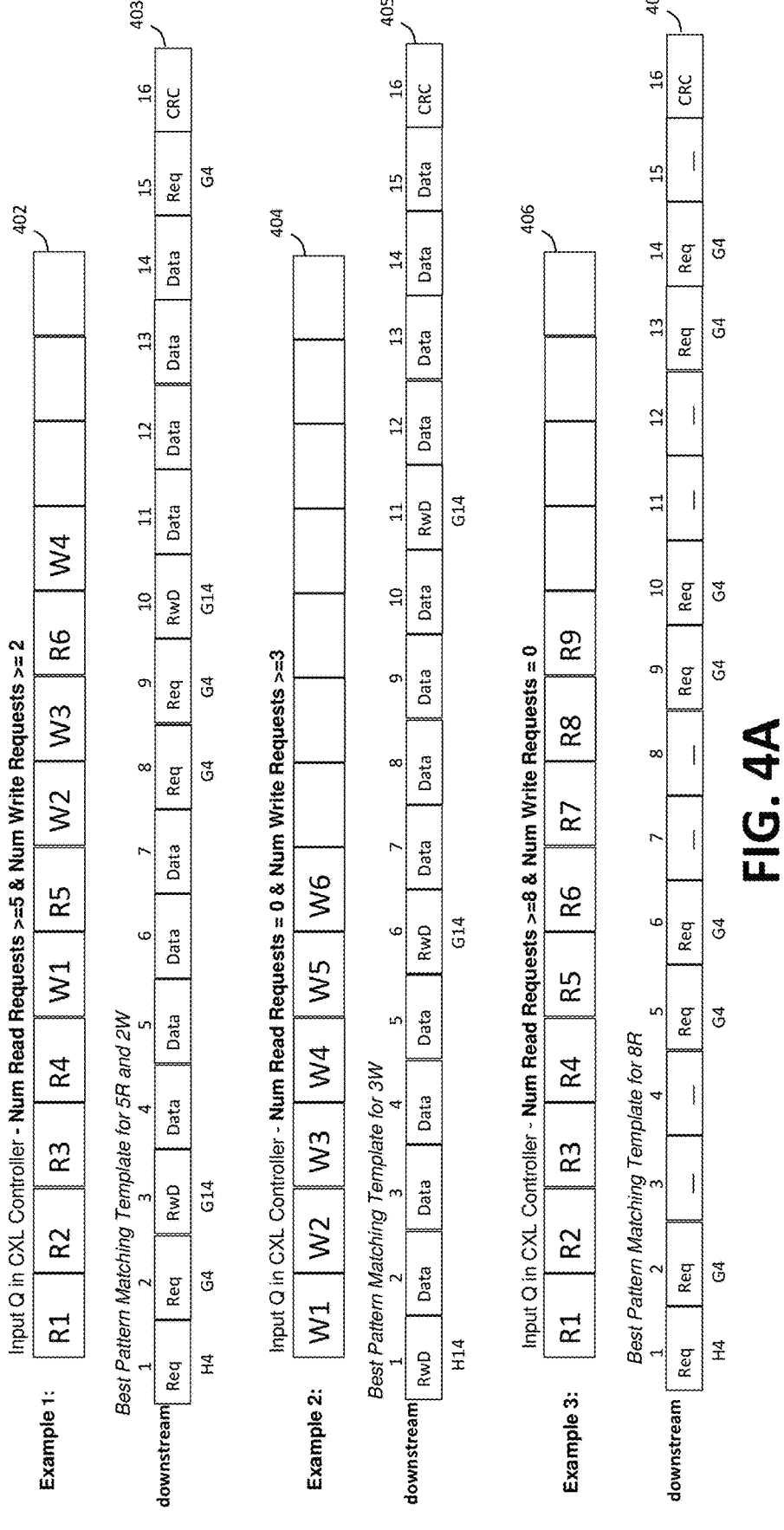
Figure 4C:
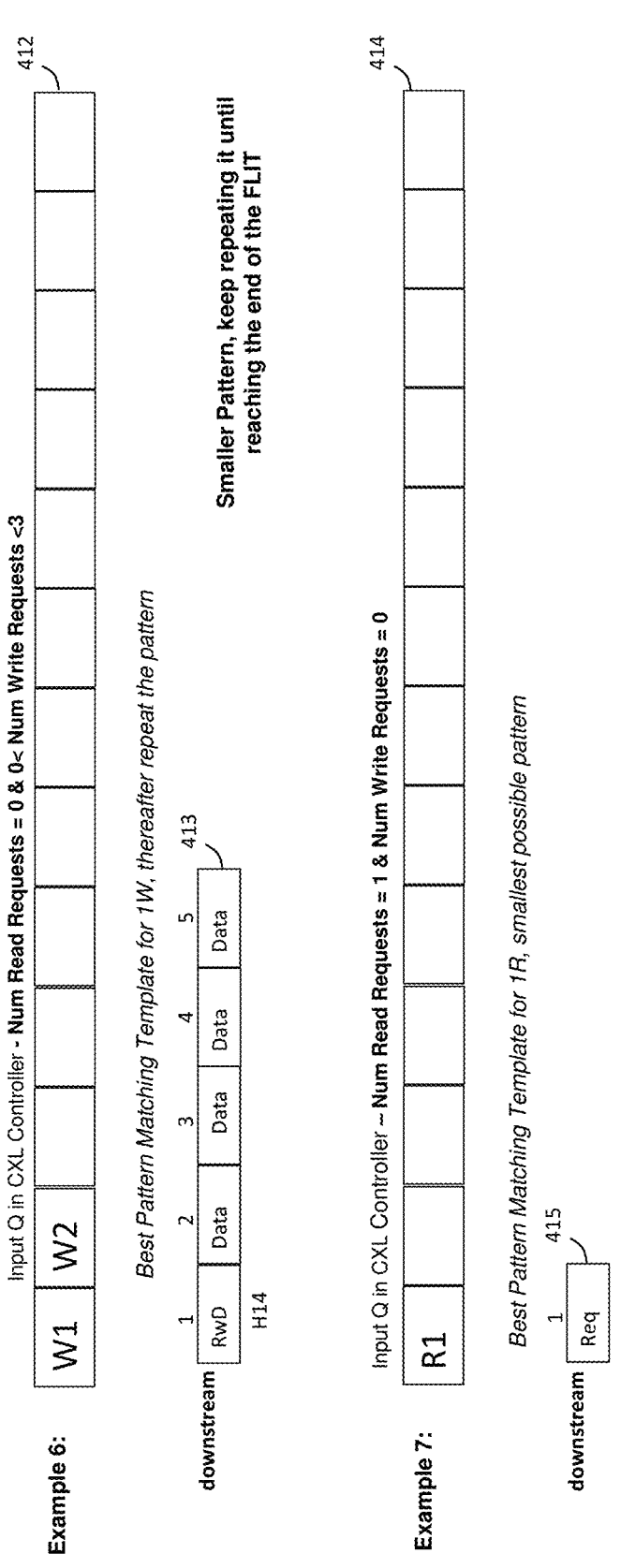

FIGS. 4A, 4B, and 4C (collectively FIG. 4) illustrate example input buffers and example flits that are each packed according to a packing template from a plurality of stored pattern matching packing templates, according to some embodiments of the present disclosure.

The first example illustrates a current input buffer 402 that contains 6 read requests R1-R6 and four write requests W1-W4. The example packing template 403 identified for the current buffer 402 as illustrated provides for carrying 5 read requests (e.g., R1-R5) and 2 write requests (e.g., W1-W2). The identified template has no empty slots. If a current flit is packed based on the input buffer 402 and template 403, when the packed flit is transmitted read requests R1-R5 and write requests W1-W2 are removed from the input buffer. R6 and W3-W4 will remain in the input buffer.

The second example illustrates a current input buffer 404 that contains 0 read requests and 6 write requests W1-W6. The example packing template 405 identified for the current buffer 404 as illustrated provides for carrying no read requests and 3 write requests (e.g., W1-W3). The identified template has no empty slots.

The third example illustrates a current input buffer 406 that contains 9 read request R1-R9 and no write requests. The example packing template 407 identified for the current buffer 406 as illustrated provides for carrying 8 read requests (e.g., R1-R8) and 0 write requests. The identified template has empty slots between each pair of read requests in accordance with CXL flit packing rules.

The fourth example illustrates a current input buffer 408 that contains 7 read requests R1-R7 and two write requests W1-W2. The example packing template 409 identified for the current buffer 408 as illustrated provides for carrying at least 2 read requests (e.g., R1-R2) and 2 write requests (e.g., W1-W2). The template may be specified as a pattern of a partial flit that specifies a pattern which can be repeated until the end of the flit is reached.

For example, the partial flit template illustrates a pattern of one read followed by a write request. When this template is selected and the current flit is being packed, the pattern can be repeated once so that two read requests and two write requests are packed in slots 1-12, and further read requests can be packed in slots 13-15.

The fifth example illustrates a current input buffer 410 that contains 7 read requests R1-R7 and no write requests. The example packing template 411 identified for the current buffer 410 as illustrated provides for carrying all 7 read requests (e.g., R1-R7). The template may be specified as a pattern of a partial flit, the pattern which can be repeated until the end of the flit is reached.

The sixth example illustrates a current input buffer 412 that contains 0 read requests and 2 write requests W1-W2. The example packing template 413 identified for the current buffer 412 as illustrated provides for carrying 0 read requests and 2 write requests (e.g., W1-W2). The template may be specified as a pattern of a partial flit, the pattern which can be repeated until the end of the flit is reached.

The seventh example illustrates a current input buffer 414 that contains 1 read request and no write requests. The example packing template 415 identified for the current buffer 414 as illustrated provides for carrying 1 read request and 0 write requests. The template may be specified as a pattern of a partial flit, the pattern which can be repeated until the end of the flit is reached.

The illustrated flit formats are in accordance with the CXL protocol specification. In some example embodiments, the G4, H4 and HS4 headers that are specified for downlink read requests in CXL specifications, and the G14, H14, and HS14 headers that are specified for downlink write requests in CXL specifications.

It will be understood that the pattern matching packing templates shown in FIG. 4 are examples and do not limit example embodiments.

FIG. 5 is a flowchart of a process 500 for packing a flit in accordance with stored pattern matching packing templates, in accordance with some embodiments of the present disclosure. Process 500 may be commenced when the packing of a new flit to be transmitted is commenced. Process 500 may be performed by the transmit circuitry of a protocol controller, such as protocol controller 300 (see FIG. 3) or CXL initiator 110 (see FIG. 1).

As described above in relation to FIG. 1 and FIG. 3, the protocol controller in the host 102 and the protocol controller on the target 104 each is configured with a respective input buffer (e.g., input queue) in which to queue the messages to be transmitted over the communication interface 106 and a link buffer in which to temporarily buffer messages received over the communication interface 106.

More specifically, an input buffer of the CXL initiator 110 temporarily buffers read request messages and write request messages to be transmitted downstream from the CXL initiator 110 to the CXL target 112 over the link 106, and an input buffer of the CXL target 112 temporarily buffers read response messages and write response messages to be transmitted upstream from the CXL target 112 to the CXL initiator 110 over the link 106.

Read response messages may be associated with data being returned, while there is no data being returned with write response messages. In some embodiments, a read request message is represented by a read header that is in a single slot of the flit that is transmitted on the link 106, a read response includes a header in a flit on the link 106 and a plurality (e.g., 4) slots of data in the same flit. In contrast, a write request includes a write header slot and four write data slots, and a write response may include a single slot. In some embodiments, two or more write responses may be combined into one flit slot.

In some embodiments, process 500 may be performed by a transmit CXL protocol controller on any CXL device that transmits read requests and write requests to another device. In some embodiments, process 500 is performed by a transmit CXL protocol controller of a CXL Type 3 device.

When process 500 is started, at operation 502, the protocol controller 300 detects that a new flit is to be packed for transmission. In an example embodiment, a new flit may be packed and transmitted at regular intervals. In another embodiment, a frame may be transmitted at predetermined intervals and/or when the predetermined proportion of slots of the frame are populated with requests to be transmitted. According to an embodiment in which the protocol controller is compliant with the CXL protocol, the flit is in accordance with the CXL flit format.

At operation 504, the controller obtains the count of pending read requests (pending read request count) and the count of pending write requests (pending write request count) from read request counter 318 and the write request counter 320, respectively. As described above, incoming read requests are buffered in buffer 302 and incoming write requests are buffered in buffer 304.

When a read request or write request is selected for transmission, that request is removed from the buffer. Counter 318 is incremented (e.g., by 1) for each read request that is put into buffer 302 and is decremented (e.g., by 1) for each read request removed from buffer 302. Likewise, counter 320 is incremented (e.g., by 1) for each write request that is put into buffer 304 and is decremented (e.g., by 1) for each write request removed from buffer 304.

In some embodiments, in addition to the pending read request count and the pending write request count, an available read request credit count and an available write request credit count are also obtained, for example, from read request transmit credit counter circuitry 322 and write request transmit credit counter circuitry 324, respectively.

The transmit circuitry and the receive circuitry of controller 160 maintain the available credit counts based on bandwidth utilization by each type of request. The available credits determine the maximum number of each type of request that can be packed into the flit that is currently being packed for transmission. In some embodiments, this means that in order to transmit n requests of a particular type in the current flit, the available transmit credit of that type should be n or greater.

At operation 506, it is determined whether adequate credits are available for transmitting each type of request. If there are insufficient credits for transmitting the buffered read requests and/or write requests, the read request and write request counts that are used for subsequently selecting a packing template are adjusted.

For example, according to one embodiment, if read request count>read credits count then set read request count=read credits count and if write request count>write credits count then set write request count=write credits count. In essence, if no credits are available for a particular type of request, for purposes of selecting the template, the number of pending requests of that type can be considered 0.

This adjustment ensures that the subsequent selection of the packing template is based on an actual maximum number of requests of each type that can be transmitted. In other words, if the buffer includes 8 read requests, but there are only 3 read transmit credits available, then the current claim can be packed with a number of read requests that does not exceed 3.

At operation 508, one packing template is selected from the plurality of packing templates in accordance with the counts of read requests and write requests. In some embodiments, the read transmits credits and write transmit credits may be passed to the memory circuitry 314 so that the count updates described above in relation to operation 506 can be performed by the memory circuitry 314 before the selection of the packing template.

The selection may be based on specifying the read request count and the write request count, which at this point represent the maximum number of requests of each type that can be packed in the current flit. Thus, in one embodiment in which the CXL flit comprises 15 of 16 slots for transmitting read requests or write requests, a flit packed with the maximum number of only read requests can carry 8 read requests. This may occur because a read request consumes 1 slot and CXL packing rules require two empty slots after every two consecutive read requests. Also, a flit packed with the maximum number of only write requests can carry a maximum of 3 write requests because each write request consumes 1 slot for the header and 4 slots for the data to be written.

Accordingly, in one embodiment, an index entry may exist for each combination of r and w where number of read requests r=0 . . . 8 and number of write requests w=0 . . . 3. Each index entry may point to a packing template that has been selected as being a preferred pattern of packed slots. In one embodiment, a respective template may be stored for each index entry. Another embodiment, one, two or more index entries may map to the same template. In any event, a plurality of packing templates is stored in the memory 314.

In some embodiments, the search for the matching index is performed serially, and the plurality of packing templates are arranged to give preference to read requests by arranging the packing templates in the order of decreasing number of read requests in the templates. In another embodiment, write requests are given preference by ordering the plurality of packing templates in order of decreasing number of write requests.

In other embodiments, the packing templates may be arranged in an order of one or more other criteria such as, for example, to increase the proportion of the link bandwidth utilized by data in the downlink and the uplink. For example, read requests only carry header information (and no data) in the downlink, and read response carry data in the uplink. Write requests may each carry one slot of header information and four slots of data per request on the downlink and write responses may each consume one slot on the uplink. In some embodiments, the searching may be performed parallelly of groups, or all, of the stored templates.

As noted above, the packing templates are stored in a memory 314 that may be a ROM, and may be configurable via, for example, the SPI interface 316. It can be assumed that, when the process 500 is run, the plurality of packing templates 326 includes a preferred pattern matching template for each of several unique possible combinations of multiple read requests and a number of write requests that can be packed in a flit. The plurality of templates may be updated at system startup and/or when protocol changes are implemented where flit formats and/or packing rules are changed.

At operation 510, the flit is packed in accordance with the selected packing template. The packing comprises populating a plurality of slots of the current flit in accordance with the slot pattern of the selected packing template. For example, for each slot of the current flit, it is determined whether the corresponding slot in the selected template is assigned a read request, a write request or is empty, and accordingly either assign a request of the corresponding type to the slot or leave the slot empty.

When a request is extracted from the read request buffer the count of pending read requests is decremented. Additionally, the available read transmit credits may be decremented. Similarly, when a request is extracted from the write request buffer the count of pending write requests is decremented. Also, the available write transmit credits may be decremented.

As described above for a given current flit being packed, a single packing template is selected, and the requests from the input buffer are assigned in accordance with the slot assignment pattern that is in the selected packing template. In some embodiments, the template's slots map one-to-one the slots of the current flit. Examples 1-3 shown in FIG. 4A are example packing templates that map slots one-to-one to those of the current flit. In some embodiments, however, the selected template is a partial flit and such templates are intended to specify a repeating pattern within the current flit. For example, examples 4-7 shown in FIGS. 4B-4C are examples of templates that specify partial flits.

At operation 512, the packed flit is transmitted. For example, the flit may be transmitted from the CXL initiator 110 (controller 300 according to some embodiments) to CXL target 112 over link 106. The CXL initiator 110 and CXL target 112 may be such that the target device is a CXL Type 3 device in which all requests for memory are initiated by the host and the target does not initiate requests for memory. Since the CXL target 112 does not initiate read requests it may be assumed that the CXL target 112 does not implement the pattern matching templates described above with regard to the CXL initiator 110. When a first request how a write request is received at the target controller 112 over the link 106, they may be stored in a buffer until they can be processed by software.

Process 500 is described above as implemented in a CXL initiator 110 (e.g., controller) of a CXL Type 3 device that transmits read request and write requests to a CXL target. However, example embodiments are not limited thereto. Those skilled in the art will understand that the teachings of this disclosure are applicable to other configurations in which a device transmits two or more different types of requests.

With example embodiments, if the packing rules or protocol changes occurs in a transmitting device, a firmware update can change the way the frames/flits are packed by loading a new set of templates (e.g., to ROM 314). This reduces the complexity of designing new hardware for every protocol or packing rule change. It also improves implementation complexity and product time to market.

Example embodiments were described above primarily in relation to the CXL 2.0 and/or 3.0 specifications. Moreover, some of the described embodiments described a CXL Type 3 memory device communicating with a host. It will, however, be understood that embodiments are not limited to the CXL or the CXL versions that are specifically mentioned here. Moreover, example embodiments may be applicable to devices other than memory devices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

For example, the various illustrative blocks and components described in connection with the disclosure herein may be implemented or performed with a general-purpose processor, a digital signal processor (DSP), an ASIC, FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A device comprising:
a memory configured to store a plurality of frame packing templates;
an interface to a bidirectional communication link;
at least one message buffer configured to store requests of a first request type and requests of a second request type to be transmitted on the bidirectional communication link;
a protocol controller configured to perform operations comprising:
selecting, based on current contents of the message buffer, a packing template from the plurality of packing templates;
packing a frame in accordance with the selected packing template, wherein the packing the frame comprises packing each slot of a plurality of slots of the frame with a respective request from the message buffer in accordance with the selected packing template; and
transmitting the packed frame on the bidirectional communication link,
wherein a pending first request counter configured to count requests of the first request type in the at least one message buffer; and
a pending second request counter configured to count requests of the second request type in the at least one message buffer, and
wherein the protocol controller is further configured to perform the selecting based on current count values in the pending first request counter and the pending second request counter.

2. The device according to claim 1, wherein each packing template of the plurality of packing templates maps, for each slot of a plurality of slots in a protocol frame format, a first request type or a second request type.

3. The device according to claim 2, wherein each request of the first request type occupies a first number of slots of the protocol frame format and each request of the second request type occupies a second number of slots in the protocol frame format, wherein the first number is smaller than the second number.

4. The device according to claim 1, further comprising:
a first request transmit credit counter; and
a second request transmit credit counter,
wherein the protocol controller is further configured to perform the selecting based on a current count value in the read request transmit credit counter or the write request transmit credit counter.

5. The device according to claim 4, wherein the protocol controller is further configured to perform the selecting based on the smaller of the current count value in the first request transmit credit counter and the current count value in the pending first request counter and the smaller of the current count value in the second request transmit credit counter and the current count value in the pending second request counter.

6. The device according to claim 1, wherein the protocol controller is further configured to perform the selecting in order to increase a number of requests of the first request type in the frame.

7. The device according to claim 6, wherein the protocol controller is further configured to perform the selecting in order to optimize bandwidth utilization of the bidirectional communication link in a transmit direction and in a receive direction.

8. The device according to claim 1, wherein the plurality of packing templates is arranged in order of a number of slots mapped to requests of the first request type.

9. The device according to claim 8, wherein the plurality of packing templates is arranged, for each respective number of slots mapped to requests of the first type of requests, in order of a number of slots mapped to requests of the second request type.

10. The device according to claim 1, wherein the plurality of packing templates is arranged in order of an increasing number of free slots.

11. The device according to claim 1, wherein the plurality of packing templates is reconfigurable.

12. The device according to claim 1, wherein the protocol controller is configured to operate according to the CXL protocol, and wherein the frame is a CXL flow control unit (flit).

13. The device according to claim 12, wherein content of each of the plurality of packing templates is arranged in accordance with flit packing rules of the CXL protocol.

14. The device according to claim 1, wherein the requests of first request type are read requests and requests of the second request type are write requests, and wherein each read request occupies one slot of the frame and each write request occupies a plurality of slots of the frame.

15. A method performed by a protocol controller, comprising:

selecting, based on current contents of at least one message buffer, a packing template from a plurality of packing templates stored in a memory arranged on a device that comprises the protocol controller and an interface to a bidirectional communication link, wherein the at least one message buffer is configured to store requests of a first request type and requests of a second request type to be transmitted on the bidirectional communication link;

packing a frame in accordance with the selected packing template, wherein the packing the frame comprises packing each slot of a plurality of slots of the frame with a respective request from the message buffer in accordance with the selected packing template; and transmitting the packed frame on the bidirectional communication link, wherein a pending first request counter configured to count requests of the first request type in the at least one message buffer, and a pending second request counter configured to count requests of the second request type in the at least one message buffer is arranged on the device, and wherein the method further comprises performing the selecting based on current count values in the pending first request counter and the pending second request counter.

16. The method according to claim 15, wherein each packing template of the plurality of packing templates maps, for each slot of a plurality of slots in a protocol frame format, a first request type or a second request type.

17. The method according to claim 15, wherein a first request transmit credit counter and a second request transmit credit counter are arranged on the device, and wherein the method further comprises performing the selecting based on a current count value in the read request transmit credit counter or the write request transmit credit counter.

18. The method according to claim 15, wherein the protocol controller is configured to operate according to the CXL protocol, and wherein the frame is a CXL flow control unit (flit).

* * * * *